(12) United States Patent
Lee et al.

(10) Patent No.: US 9,176,327 B2
(45) Date of Patent: Nov. 3, 2015

(54) THREE-DIMENSIONAL DISPLAY FOR NAKED EYES

(71) Applicant: Samsung Display Co., Ltd., Yongin, Gyeonggi-Do (KR)

(72) Inventors: Young-Shin Lee, Yongin (KR);
Ok-Keun Song, Yongin (KR);
Yong-Han Lee, Yongin (KR);
Byoung-Hee Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 74 days.

(21) Appl. No.: 13/971,791

(22) Filed: Aug. 20, 2013

(65) Prior Publication Data

US 2014/0177046 A1    Jun. 26, 2014

(30) Foreign Application Priority Data

Dec. 24, 2012    (KR) .......................... 10-2012-0152502

(51) Int. Cl.
*G02B 27/22*    (2006.01)
(52) U.S. Cl.
CPC ................................. *G02B 27/2214* (2013.01)
(58) Field of Classification Search
CPC .................................................. G02B 27/2214

USPC .................. 359/464, 462; 313/498, 502–506;
345/55, 60, 65
See application file for complete search history.

(56) References Cited

U.S. PATENT DOCUMENTS

| 2011/0006327 | A1* | 1/2011 | Park et al. ........................ 257/98 |
| 2012/0104938 | A1* | 5/2012 | Chu et al. ....................... 313/504 |
| 2012/0262362 | A1* | 10/2012 | Uehara et al. ................... 345/88 |

FOREIGN PATENT DOCUMENTS

| JP | 2002-216960 A | 8/2002 |
| KR | 10-2006-0004818 A | 1/2006 |
| KR | 10-2011-0005592 A | 1/2011 |
| KR | 10-2012-0045381 A | 5/2012 |

* cited by examiner

*Primary Examiner* — Scott J Sugarman
*Assistant Examiner* — Wen Huang
(74) *Attorney, Agent, or Firm* — Christie, Parker & Hale, LLP

(57) ABSTRACT

Provided is a three-dimensional display. The display includes a substrate including a plurality of pixel areas; a barrier layer on a first surface of the substrate and at an area corresponding to a boundary between neighboring pixel areas of the plurality of pixel areas; a driving circuit layer on the barrier layer; and a display device layer on the driving circuit layer and forming pixels at positions corresponding to the plurality of pixel areas, wherein light emitted by the display device layer is emitted outside via a second surface of the substrate opposite to the first surface of the substrate.

23 Claims, 4 Drawing Sheets

THREE-DIMENSIONAL DISPLAY FOR NAKED EYES

CROSS-REFERENCE TO RELATED PATENT APPLICATION

This application claims priority to and the benefit of Korean Patent Application No. 10-2012-0152502, filed on Dec. 24, 2012, in the Korean Intellectual Property Office, the disclosure of which is incorporated herein in its entirety by reference.

BACKGROUND

1. Field

Aspects of the present invention relate to a three-dimensional display for the naked eyes.

2. Description of the Related Art

An organic light-emitting display apparatus typically includes an organic light-emitting diode (OLED) including a hole injection electrode, an electron injection electrode, and an organic emission layer disposed between the hole injection electrode and the electron injection electrode, and is a self-emissive display apparatus in which light is emitted while excitons generated when holes injected by the hole injection electrode and electrons injected by the electron injection electrode are combined in the organic emission layer transition from an excited state to a ground state.

A self-emissive organic light-emitting display apparatus may be driven at a low voltage without requiring an additional light source, and may be formed as a thin film having a small weight and thickness. In addition, due to advantages such as wide viewing angles, high contrast, and fast response speeds, an organic light-emitting display apparatus has been in the spotlight as a display apparatus for the next generation.

In recent years, consumer demand for three-dimensional image displays has steadily increased. Generally, methods for allowing humans to perceive a three-dimensional effect involve using both eyes, i.e., a left eye and a right eye of a human, or using one of the left eye and the right eye. For example, because the left eye and the right eye are separated from each other, slightly different images may be displayed to each eye. That is, different images may be visible by the left eye and the right eye, respectively, consistent with binocular disparity between the left and right eyes.

Methods of realizing the binocular disparity include a glasses type and a glassless type. The glassless type includes a lenticular method, which involves using a lenticular lens plate with a lens array vertically arranged, and a parallax barrier method. In case of such glassless types, while it may be unnecessary for users to additionally wear glasses, and it may be more convenient for users, the glassless type method of displaying three-dimensional images may be more difficult to express a three-dimensional effect and distance relative to the glasses type.

SUMMARY

Embodiments of the present invention provide a configuration of a parallax barrier type three-dimensional display for the naked eyes.

According to one embodiment of the present invention, there is provided a three-dimensional display. The three-dimensional display includes a substrate comprising a plurality of pixel areas; a barrier layer on a first surface of the substrate and at an area corresponding to a boundary between neighboring pixel areas of the plurality of pixel areas; a driving circuit layer on the barrier layer; and a display device layer on the driving circuit layer and forming pixels at positions corresponding to the plurality of pixel areas, wherein light emitted by the display device layer is emitted outside via a second surface of the substrate opposite to the first surface of the substrate.

Each of the pixels may include a left eye pixel and a right eye pixel.

A first black matrix layer may be between the left eye pixel and the right eye pixel.

The left eye pixel and the right eye pixel may include sub-pixels emitting different colors, respectively, and the display may further include a second black matrix layer at a boundary between the sub-pixels.

The first black matrix layer may be at a same plane as the barrier layer.

The second black matrix layer may include a same material as the first black matrix layer and may be at a same plane as the first black matrix layer.

Each of the left eye pixel and the right eye pixel may include a red sub-pixel, a green sub-pixel, and a blue sub-pixel.

Each of the left eye pixel and the right eye pixel may include a red sub-pixel, a green sub-pixel, a blue sub-pixel, and a white sub-pixel.

The display device layer may include: a color filter on the driving circuit layer and at least a portion of the plurality of pixel areas; a first electrode layer on the color filter and having light-transmitting property; an organic emission layer on the color filter; and a second electrode layer on the organic emission layer and having reflexibility.

A portion of the barrier layer may overlap a portion of the color filter.

A distance between the barrier layer and the display device layer may be in a range of about 1 micrometer (μm) to about 1.5 millimeters (mm).

The barrier layer may include at least one of organic materials or inorganic materials including light-proof elements.

According to another embodiment of the present invention, there is provided a three-dimensional display including a substrate including a plurality of pixel areas; a barrier layer on a first surface of the substrate and at an area corresponding to a boundary between neighboring pixel areas of the plurality of pixel areas; a driving circuit layer on the barrier layer; and a display device layer on the driving circuit layer and forming pixels at positions corresponding to the plurality of pixel areas, wherein each of the pixels includes a red sub-pixel, a green sub-pixel, a blue sub-pixel, and a white sub-pixel, and wherein light emitted by the sub-pixels is emitted outside via a second surface of the substrate opposite to the first surface of the substrate.

A black matrix layer may be at a boundary between the sub-pixels.

The black matrix layer may be at a same layer as the barrier layer.

The black matrix layer and the barrier layer may include a same material.

Each of the pixels may include: a left eye pixel including a first red sub-pixel, a first green sub-pixel, a first blue sub-pixel, and a first white sub-pixel; and a right eye pixel including a second red sub-pixel, a second green sub-pixel, a second blue sub-pixel, and a second white sub-pixel.

A portion of the barrier layer, adjacent to the left eye pixel, may overlap a portion of the left eye pixel, and a portion of the barrier layer, adjacent to the right eye pixel, may overlap a portion of the right eye pixel.

The display device layer may include color filters on the driving circuit layer and at areas corresponding to the red sub-pixel, the green sub-pixel, the blue sub-pixel, and the white sub-pixel; a first electrode layer on the color filters, wherein the first electrode layer is configured to transmit light; an organic emission layer on the first electrode layer and configured to emit white light; and a second electrode layer on the organic emission layer and having reflexibility.

A portion of the barrier layer may overlap a portion of the color filter.

A distance between the barrier layer and the display device layer may be in a range of about 1 μm to about 1.5 mm.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
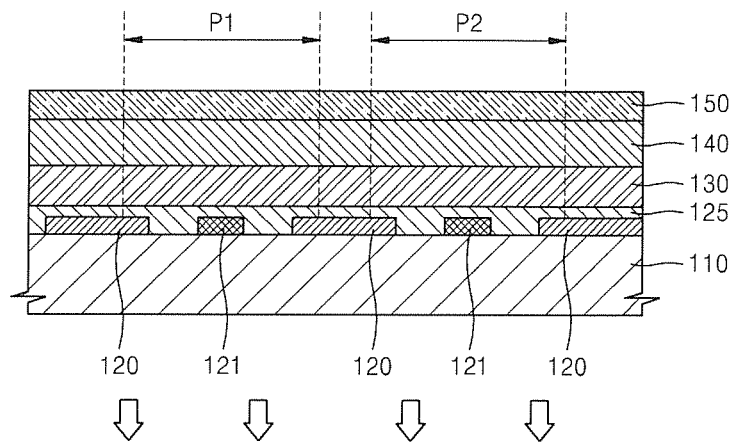
FIG. 1 is a cross-sectional view illustrating a three-dimensional display for the naked eyes according to an embodiment of the present invention.

The present invention will now be described more fully with reference to the accompanying drawings, in which exemplary embodiments of the invention are shown. However, the present invention is not limited to the embodiments, and should be understood as including the changes, the equivalents, and the substitutes included in the technical scope of the present invention. While describing the embodiments, a detailed description of well-known related art, which may prevent explaining the points of the present invention, will be omitted. Terms such as a first, a second may be used to describe various elements but the elements are not limited thereto. Terms are used only to distinguish one element from another element. Terms used in the present application are used only to describe certain embodiments, but the present invention is not limited thereto. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

In the drawings, the thicknesses of layers and regions are exaggerated for clarity. It will also be understood that when a layer is referred to as being "on" another layer or substrate, it can be directly on the other layer or substrate, or intervening layers may also be present.

Figure 2:
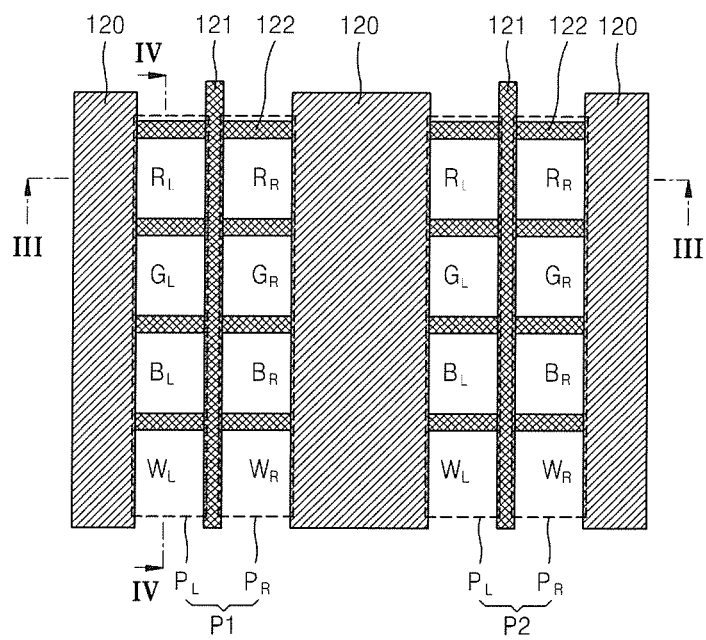
FIG. 2 is a bottom view illustrating the three-dimensional display for the naked eyes of FIG. 1.

FIG. 1 is a cross-sectional view schematically illustrating a three-dimensional display for the naked eyes according to an embodiment of the present invention, and FIG. 2 is a bottom view illustrating the three-dimensional display for the naked eyes of FIG. 1.

Referring to FIGS. 1 and 2, the three-dimensional display for the naked eyes may comprise a visual barrier layer 120, a driving circuit layer 130, a display device layer 140, and an encapsulation element 150 formed on a first surface of a substrate 110, respectively. The three-dimensional display for the naked eyes may be a bottom-emission type display in which light emitted from the display device layer 140 is emitted via a second surface of the substrate 110. In the three-dimensional display for the naked eye, a pixel $P_L$ for the left eye (hereinafter referred to as a "left-eye pixel $P_L$") and a pixel $P_R$ for the right eye (hereinafter referred to as a "right-eye pixel $P_R$") form one pixel to provide a three-dimensional effect. Each of the left-eye pixel $P_L$ and the right-eye pixel $P_R$ may include red sub-pixels $R_L$ and $R_R$, green sub-pixels $G_L$ and $G_R$, blue sub-pixels $B_L$ and $B_R$, and white sub-pixels $W_L$ and $W_R$.

The substrate 110 may be formed of light-transmissive/transparent glass with an $SiO_2$ base. As another example, the substrate 110 may be formed of another material such as light-transmissive/transparent plastic.

The visual barrier layer 120 is formed on the first surface of the substrate 110. The visual barrier layer 120 may be disposed or located on an area between a plurality of pixel areas. For example, as shown in FIG. 1, the visual barrier layer 120 is formed on or at an area corresponding to a boundary between a first pixel area P1 and a second pixel area P2 adjacent to each other and generates parallax on an image formed by light emitted from the display device layer 140.

As shown in FIG. 2, the respective pixel areas P1 and P2 formed between the visual barrier layer 120 include a left-eye pixel $P_L$ and a right-eye pixel $P_R$. The left-eye pixel $P_L$ and the right-eye pixel $P_R$ may include red sub-pixels $R_L$ and $R_R$, green sub-pixels $G_L$ and $G_R$, blue sub-pixels $B_L$ and $B_R$, and white sub-pixels $W_L$ and $W_R$, respectively. An image formed by light emitted from the left-eye pixel $P_L$ is sent to or is visible by the left eye of a user and an image formed by light emitted from the right-eye pixel $P_R$ is sent to or is visible by the right eye of the user in such a way that the user may feel or perceive a three-dimensional effect via parallax between the images sent to the left eye and the right eye.

The visual barrier layer 120 may be a parallax barrier layer. The visual barrier layer 120 may include at least one of light-proof organic materials and inorganic materials. For example, as the organic materials included in the visual barrier layer 120, organic materials with a pigment such as carbon black or titanium oxide may be used. As the inorganic materials of the visual barrier layer 120, inorganic materials such as chrome, chrome oxide, and chrome nitride may be used.

A black matrix layer is formed or positioned on the first surface of the substrate 110. For example, the black matrix layer may be disposed (e.g., located or positioned) on the same plane as the visual barrier layer 120. The black matrix layer may include first and second matrix layers 121 and 122. The first black matrix layer 121 may be disposed on (e.g., located at) a boundary area or border between the left-eye pixel $P_L$ and the right-eye pixel $P_R$. For example, the first black matrix layer 121 may be formed on (e.g., located at) a boundary area or border between respective sub-pixels $R_L$, $G_L$, $B_L$, and $W_L$ forming the left-eye pixel $P_L$ and respective sub-pixels $R_R$, $G_R$, $B_R$, and $W_R$ forming the right-eye pixel $P_R$ and may prevent or reduce mixing of light emitted from the left-eye pixel $P_L$ and the right-eye pixel $P_R$, that is, mixing images therefrom.

The second black matrix layer 122 may be disposed on (e.g., located at) a boundary area or border between red sub-pixels $R_L$ and $R_R$, green pixels $G_L$ and $G_R$, blue pixels $B_L$ and $B_R$, and white pixels $W_L$ and $W_R$ provided to the left-eye pixel $P_L$ and the right-eye pixel $P_R$, respectively, and may prevent color mixing between the respective sub-pixels $R_L$, $G_L$, $B_L$, and $W_L$ forming the left-eye pixel $P_L$ and the respective sub-pixels $R_R$, $G_R$, $B_R$, and $W_R$ forming the right-eye pixel $P_R$.

The driving circuit layer 130 may include a device and/or wirings for driving the display device layer 140 that will be described later. For example, the driving circuit layer 130 may include a driving thin film transistor (TFT), a switching TFT, a capacitor, and wirings coupled to TFTs and a capacitor.

The display device layer 140 is located (e.g., formed) on the driving circuit layer 130 and may emit red, green, blue, and white lights. The light emitted by the display device layer 140 is discharged outside (e.g., emitted by the display device) via (e.g., through) the second surface of the substrate 110.

The display device layer 140 may include an organic emission layer configured to emit white light. The white light emitted from the organic emission layer may be changed to red light, green light, and blue light by passing through red, green, and blue color filters positioned at at least one part or portion of a pixel. More specifically, the color filters are provided in areas corresponding to the red, green, and blue sub-pixels $R_L$, $R_R$, $G_L$, $G_R$, $B_L$, and $B_R$, forming the left-eye pixel $P_L$ and the right-eye pixel $P_R$. Meanwhile, because there is no color filter provided in the white sub pixels $W_L$ and $W_R$, light emitted from the organic emission layer may be emitted as white light. In the present embodiment, the left-eye pixel $P_L$ and the right-eye pixel $P_R$ include not only the red, green, and blue sub-pixels $R_L$, $R_R$, $G_L$, $G_R$, $B_L$, and $B_R$ but also the white sub pixels $W_L$ and $W_R$, respectively, thereby preventing or reducing luminance/brightness degradation.

As described above, the left-eye pixel $P_L$ and the right-eye pixel $P_R$ may include not only the red, green, and blue sub-pixels $R_L$, $R_R$, $G_L$, $G_R$, $B_L$, and $B_R$ but also the white sub pixels $W_L$ and $W_R$, respectively, but the present invention is not limited thereto. As another example, the left-eye pixel $P_L$ and the right-eye pixel $P_R$ include only the red, green, and blue sub-pixels $R_L$, $R_R$, $G_L$, $G_R$, $B_L$, respectively. However, when brightness of a display is lowered, a three-dimensional effect may be lowered and mixed images may be perceived, which may limit the ability of the display to provide a three-dimensional image. In this case, the left-eye pixel $P_L$ and the right-eye pixel $P_R$ may include the red, green, blue, and white sub-pixels $R_L$, $R_R$, $G_L$, $G_R$, $B_L$, $B_R$, $W_L$, and $W_R$, respectively.

The encapsulation element 150 may be located (e.g., formed or positioned) on the display device layer 140 and configured to protect the display device layer 140 from the outside such as contaminants or physical stress. The encapsulation element 150 may include an organic material layer and/or an inorganic material layer, which are alternately stacked. In one embodiment, the encapsulation element 150 includes a filler and an encapsulation substrate such as glass formed on the filler.

Hereinafter, with reference to FIGS. 3 to 5, there will be described a more detailed description of the three-dimensional display for the naked eyes of FIG. 1.

Figure 3:
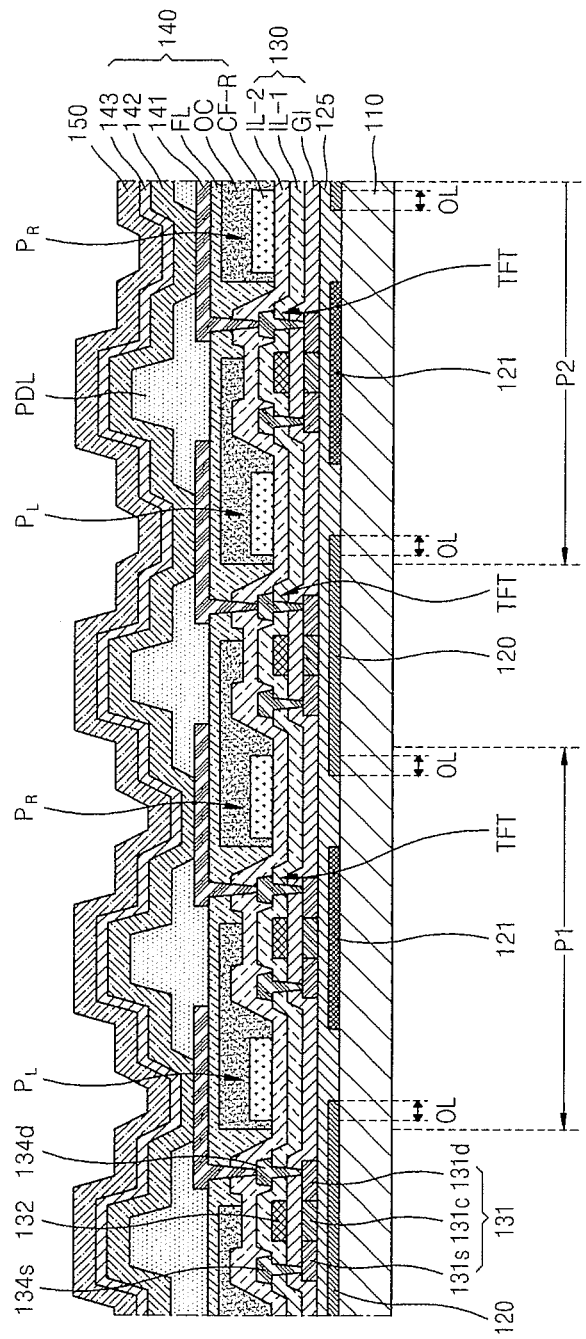
FIG. 3 is a cross-sectional view illustrating the three-dimensional display for the naked eye, taken along the line shown in FIG. 2.
Figure 4:
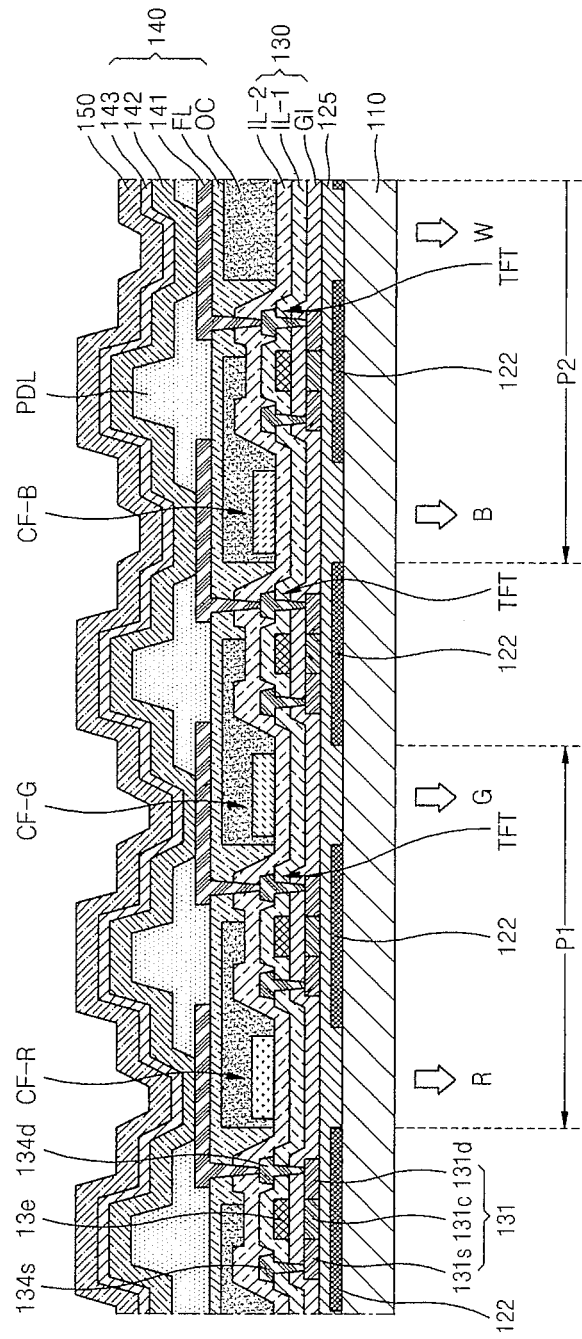
FIG. 4 is a cross-sectional view illustrating the three-dimensional display for the naked eye, taken along the line IV-IV of FIG. 2.

FIG. 3 is a cross-sectional view illustrating the three-dimensional display for the naked eyes taken along a line III-III shown in FIG. 2, and FIG. 4 is a cross-sectional view illustrating the three-dimensional display for the naked eyes taken along a line IV-IV of FIG. 2.

Referring to FIGS. 2, 3, and 4, the visual barrier layer 120 may be formed on the position or location corresponding to the boundary or border between of the pixel areas P1 and P2 adjacent to each other. The first black matrix layer 121 is formed between the respective left-eye pixel $P_L$ and the right-eye pixel $P_R$. The second black matrix layer 122 is formed between the respective sub-pixels $R_L$, $G_L$, $B_L$, $W_L$, $R_R$, $G_R$, $B_R$, and $W_R$ in the left-eye pixel $P_L$ and the right-eye pixel $P_R$.

Referring to FIGS. 2 and 3, the left-eye pixel $P_L$ and the right eye pixel $P_R$ are arranged or located between the neighboring or adjacent visual barrier layers 120. Although FIG. 3 illustrates the red sub-pixel $R_L$ and the red sub-pixel $R_R$, this configuration may also be applied with respect to the area between the green sub-pixels $G_L$ and $G_R$, the area between the blue sub-pixels $B_L$ and $B_R$, and the area between the white sub-pixels $W_L$ and $W_R$. Additionally, the difference between the white sub-pixels $W_L$ and $W_R$ may only be in the existence (or lack) of a color filter.

The first black matrix layer 121 may be formed on (or located at) the area corresponding to the boundary or border between the left-eye pixel $P_L$ and the right-eye pixel $P_R$ or the area corresponding to the boundary or border between the sub-pixels forming the left-eye pixel $P_L$ and the sub-pixels forming the right-eye pixel $P_R$.

Referring to FIGS. 2 and 4, the red, green, blue, and white sub-pixels $R_L$, $G_L$, $B_L$, and $W_L$ form the left-eye pixel $P_L$. In FIG. 4, though it is shown that the red, green, blue, and white sub-pixels $R_L$, $G_L$, $B_L$, and $W_L$ form the left-eye pixel $P_L$, the right-eye pixel $P_R$ may include the red, green, blue, and white sub-pixels $R_R$, $G_R$, $B_R$, and $W_R$ and also may have the same configuration as that shown in FIG. 4.

The second black matrix layer 122 may be formed on (e.g., located or positioned at) the area corresponding to the boundary between the sub-pixels $R_L$, $G_L$, $B_L$, and $W_L$ forming the left-eye pixel $P_L$, respectively. Additionally, the second black matrix layer 122 may be formed on (e.g., located or positioned at) the area corresponding to the boundary between the $R_R$, $G_R$, $B_R$, and $W_R$ forming the right-eye pixel $P_R$, respectively.

The visual barrier layer 120 and the first and second black matrix layers 121 and 122 may be formed of or include the same material. The visual barrier layer 120 and the first and second black matrix layers 121 and 122 may be directly on the first surface of the substrate 110 and may be formed at substantially the same time by using a method such as screen printing, imprinting, and photo masking.

The left-eye pixel $P_L$ may be overlapped with a part of the visual barrier layer 120 adjacent to the left-eye pixel $P_L$, and the right-eye pixel $P_R$ may be overlapped with a part of the visual barrier layer 120 adjacent to the right-eye pixel $P_R$. In FIG. 3, the overlapped areas are designated as OL. The visual barrier layer 120 and the left-eye pixel $P_L$ and the right-eye pixel $P_R$ are overlapped with one another, thereby preventing or reducing an image formed by the left-eye pixel $P_L$ from coming into the right eye of the user and preventing an image formed by the right-eye pixel $P_R$ from coming into the left eye of the user.

An auxiliary layer 125 is formed (e.g., positioned) on the visual barrier layer 120 and the first and second black matrix layers 121 and 122 to prevent or reduce water or air penetration and to planarize a surface. The auxiliary layer 125 may include $SiO_2$ and/or $SiN_x$ and may be formed by using various deposition methods such as a plasma enhanced chemical vapor deposition (PECVD) method, an atmospheric pressure CVD (APCVD) method, and a lower pressure CVD (LPCVD) method.

The driving circuit layer 130 may be formed on the auxiliary layer 125 and may include TFTs, capacitors (not shown), and wirings (not shown) for driving the respective sub-pixels.

The TFTs may include an active layer 131, a gate electrode 132, a source electrode 134$s$, and a drain electrode 134$d$. Between the gate electrode 132 and the active layer 131, a gate insulation film GI for insulation is interposed therebetween. A source region 131$s$ and a drain region 131$d$, which are doped with high concentration of impurities, and are formed or located respectively at edges of the active layer 131 with a channel region 131$c$ in therebetween. The active layer 131 is not limited to amorphous silicon or crystalline silicon but may include an oxide semiconductor.

A first interlayer insulating film IL-1 is formed over the gate electrode 132 and positioned between the gate electrode 132, the source electrode 134$s$ (which is electrically coupled to the source region 131$s$), and the drain electrode 134$d$ (which is electrically coupled to the drain region 131$d$). A second interlayer insulating film IL-2 may be formed over the first interlayer insulating film IL-1 and the source electrode 134$s$ and the drain electrode 134$d$.

In FIGS. 3 and 4, there is shown top gate type TFTs, but the present invention is not limited thereto. As another embodiment, bottom gate type TFTs may be used.

The display device layer 140 emits light at positions corresponding to a plurality of pixel areas. In more detail, the display device layer 140 may emit red, green, blue, and white light, and for this, may include color filters CF-R, CF-G, and CF-B, a first electrode layer 141, an organic emission layer 142, and a second electrode layer.

The color filters CF-R, CF-G, and CF-B may be formed on the driving circuit layer 130. The color filters CF-R, CF-G, and CF-B may be located or positioned on at least parts or portions of the respective pixel areas, (e.g., on positions corresponding to red sub-pixels, a green sub-pixel, and a blue sub-pixel). A color filter may not be positioned or located at a position corresponding to a white sub-pixel.

An overcoat layer OC may be formed on the color filters CF-R, CF-G, and CF-B to cover the color filters CF-R, CF-G, and CF-B. The overcoat layer OC may be formed of one of ploy-imide, acryl, and an inorganic insulating layer SiNx. A planarization film FL may be formed on the overcoat layer OC to cover (e.g., extend laterally across) the entire surface of the substrate 110.

The first electrode layer 141 is a pixel electrode and may be formed on the planarization film FL. The first electrode layer 141 is formed on areas corresponding to the respective sub-pixels. The first electrode layer 141 may have light-transmitting property to allow light to be emitted via the first electrode layer 141. The first electrode layer 141 may include at least one selected from the group consisting of indium tin oxide (ITO), indium zinc oxide (IZO), zinc oxide (ZnO), indium oxide (In2O3), indium gallium oxide (IGO), and aluminum zinc oxide (AZO).

A pixel definition film PDL may be formed on the planarization film FL and may define areas of the sub-pixels, respectively.

The organic emission layer 142 is formed on the first electrode layer 141 and may emit white light. The organic emission layer 142 may be formed by vertically depositing light emission layers emitting red, green, and blue lights or by mixing light emitting materials emitting red, green, and blue lights. In another embodiment, the organic emission layer 142 may be formed by vertically depositing light emission layers emitting blue and yellow light that have the relationship of complementary colors or by mixing light emitting materials emitting complementary-color light.

The organic emission layer 142 may include, if necessary, a hole transport layer HTL, a hole injection layer HIL, an electron transport layer ETL, and an electron injection layer EIL.

The second electrode layer 143 is formed on the organic emission layer 142. The second electrode layer 143 may be formed as a common electrode. The second electrode layer 143 may operate as a reflecting electrode and include reflecting materials. For example, the second electrode 143 may include one or more selected from the group consisting of Ag, Al, Mg, Li, Ca, LiF/Ca, and LiF/Al.

The encapsulation element 150 is formed on the second electrode layer 143 and may include the thin film encapsulation configuration formed by alternately positioning (e.g., forming) an organic film or an inorganic film. In another embodiment, the encapsulation element 150 may include the filler and the encapsulation substrate 110 formed on the filler.

With reference to FIGS. 3 and 4, it has been described that, in the display device layer 140, the white light emitted by the organic emission layer 142 passes through the color filters CF-R, CF-G, and CF-B and the area without color filter, and red, green, blue, and white light is emitted via the respective sub-pixel areas. However, the present invention is not limited thereto. Although not shown in the drawings, in another embodiment, a light emitting layer configured to emit red light is provided on (e.g., located at) an area corresponding to the red sub-pixel, thereby reducing the need to include an additional red color filter. A light emitting layer configured to emit green light is provided on (e.g., located at) an area corresponding to the green sub-pixel, thereby reducing the need to include an additional green color filter. A light emitting layer configured to emit blue light is provided on (e.g., located at) an area corresponding to the blue sub-pixel, thereby reducing the need to include an additional blue color filter. The white light may be provided or emitted by depositing red, green, and blue light emitting layers on the area corresponding to the white sub-pixel or by depositing complementary color light emitting layers.

In the three-dimensional display for the naked eyes with the configuration as described above, light emitted by the organic emission layer 142 is outputted (e.g., emitted or transmitted) via (e.g., through) the second surface of the substrate 110. As described with reference to FIG. 2, an image emitted by the left-eye pixel $P_L$ comes into (e.g., is visible by) the left eye of the user and an image emitted by the right-eye pixel $P_R$ comes into (e.g., is visible by) the right eye of the user, thereby allowing the user to feel or perceive a three-dimensional effect.

Figure 5:
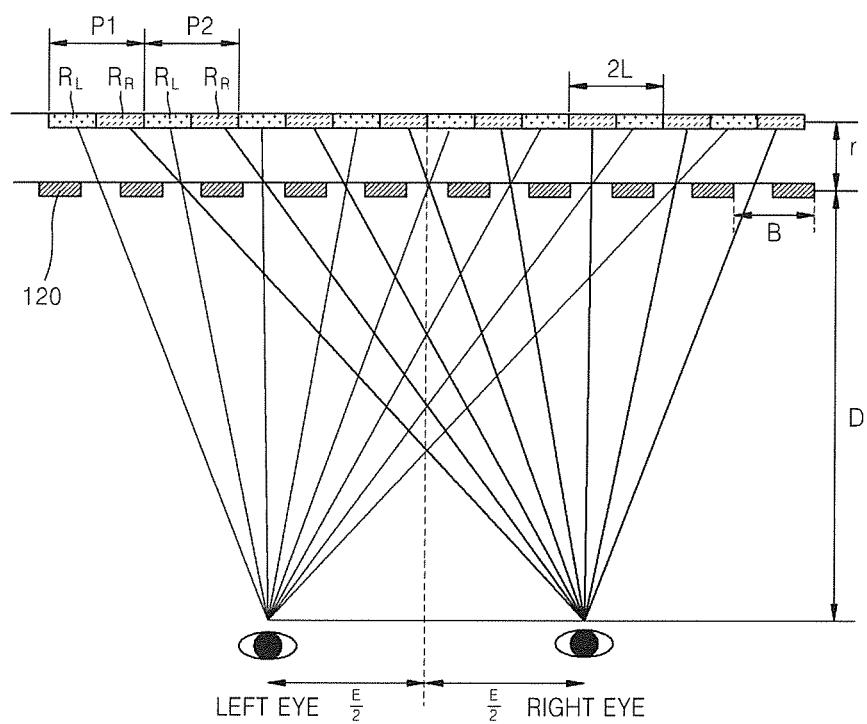
FIG. 5 is a schematic representation of a three-dimensional display illustrating a user viewing a three-dimensional image via the three-dimensional display for the naked eyes according to an embodiment of the present invention.

FIG. 5 is a schematic representation illustrating a user perceiving a three-dimensional image via the three-dimensional display for the naked eyes according to an embodiment of the present invention.

Referring to FIG. 5, the respective pixels form images via the left-eye pixel $P_L$ and the right-eye pixel $P_R$ and an image formed by the left-eye pixel $P_L$ and an image formed by the right-eye pixel $P_R$ come into the left eye and the right eye via the visual barrier layer 120, respectively.

In this case, the three-dimensional effect felt by the user may be affected or influenced by a distance r between the visual barrier layer 120 and the display device layer 140 and a size L of the pixels. In the three-dimensional display for the naked eyes, a relation between the distance r between the visual barrier layer 120 and the display device layer 140 and the size L of the pixels is as follows.

$$\frac{L}{r} = \frac{2}{(1+2m)}\tan\left(\sin^{-1}\left(\frac{1}{n_1}\sin\left(\tan^{-1}\left(\frac{E}{2D}\right)\right)\right)\right) \quad \text{Equation (1)}$$

In this case, E indicates a distance between the left eye and the right eye, $n_1$ indicates a refractive index of the substrate, and m indicates a mode of visual point of observer.

According to the present embodiment, the visual barrier layer 120 is above/directly on the first surface of the substrate 110 and the driving circuit layer 130 is positioned or located between the visual barrier layer 120 and the display device layer 140, thereby easily controlling the distance r. That is, it is unnecessary to deposit an additional dummy layer to control the distance r between the visual barrier layer 120 and the display device layer 140 and the distance r may be controlled by controlling a thickness of the driving circuit layer 130 positioned therebetween.

According to the embodiments of the three-dimensional display for the naked eyes, the configuration as described above may be suitable for high-resolution displays with a small pixel size L. As shown in Equation 1, when the pixel size L is small, the distance r between the visual barrier layer 120 and the display device layer 140 needs a small value. As an example, in the three-dimensional display for the naked eyes, the distance r between the visual barrier layer 120 and the display device layer 140 may be formed to be smaller than 1.5 mm. When the distance r is greater than 1.5 mm, it is necessary to add an additional dummy layer and processing properties may be deteriorated. As an example, the distance r between the visual barrier layer 120 and the display device layer 140 may be in a range of about 1 micrometer (μm) to about 1.5 millimeters (mm). The distance r may be properly controlled considering resolution within a range from about 1 μm to about 1.5 mm. As the resolution becomes higher, the distance r may become smaller.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A three-dimensional display comprising:
   a substrate comprising a plurality of pixel areas;
   a barrier layer on a first surface of the substrate and at an area corresponding to a boundary between neighboring pixel areas of the plurality of pixel areas;
   a driving circuit layer on the barrier layer; and
   a display device layer on the driving circuit layer and forming pixels at positions corresponding to the plurality of pixel areas,
   wherein light emitted by the display device layer is emitted outside via a second surface of the substrate opposite to the first surface of the substrate, and
   wherein the driving circuit layer is between the barrier layer and the display device layer.

2. The display of claim 1, wherein each of the pixels comprises a left eye pixel and a right eye pixel.

3. The display of claim 2, further comprising a first black matrix layer between the left eye pixel and the right eye pixel.

4. The display of claim 3, wherein the left eye pixel and the right eye pixel comprise sub-pixels emitting different colors, respectively, and
   the display further comprises a second black matrix layer at a boundary between the sub-pixels.

5. The display of claim 3, wherein the first black matrix layer is at a same plane as the barrier layer.

6. The display of claim 4, wherein the second black matrix layer comprises a same material as the first black matrix layer and is at a same plane as the first black matrix layer.

7. The display of claim 2, wherein each of the left eye pixel and the right eye pixel comprises a red sub-pixel, a green sub-pixel, and a blue sub-pixel.

8. The display of claim 2, wherein each of the left eye pixel and the right eye pixel comprises a red sub-pixel, a green sub-pixel, a blue sub-pixel, and a white sub-pixel.

9. The display of claim 1, wherein the display device layer comprises:
   a color filter on the driving circuit layer and at least a portion of the plurality of pixel areas;
   a first electrode layer on the color filter and having light-transmitting property;
   an organic emission layer on the color filter; and
   a second electrode layer on the organic emission layer and having reflexibility.

10. The display of claim 9, wherein a portion of the barrier layer overlaps a portion of the color filter.

11. The display of claim 1, wherein a distance between the barrier layer and the display device layer is in a range of 1 micrometer (μm) to 1.5 millimeters (mm).

12. The display of claim 1, wherein the barrier layer comprises at least one of organic materials or inorganic materials comprising light-proof elements.

13. A three-dimensional display comprising:
   a substrate comprising a plurality of pixel areas;
   a barrier layer on a first surface of the substrate and at an area corresponding to a boundary between neighboring pixel areas of the plurality pixel areas;
   a driving circuit layer on the barrier layer; and
   a display device layer on the driving circuit layer and forming pixels at positions corresponding to the plurality of pixel areas,
   wherein each of the pixels comprises a red sub-pixel, a green sub-pixel, a blue sub-pixel, and a white sub-pixel, and
   wherein light emitted by the sub-pixels is emitted outside via a second surface of the substrate opposite to the first surface of the substrate, and
   wherein the driving circuit layer is between the barrier layer and the display device layer.

14. The display of claim 13, further comprising a black matrix layer at a boundary between the sub-pixels.

15. The display of claim 14, wherein the black matrix layer is at a same layer as the barrier layer.

16. The display of claim 14, wherein the black matrix layer and the barrier layer comprise a same material.

17. The display of claim 13, wherein each of the pixels comprises:
   a left eye pixel comprising a first red sub-pixel, a first green sub-pixel, a first blue sub-pixel, and a first white sub-pixel; and
   a right eye pixel comprising a second red sub-pixel, a second green sub-pixel, a second blue sub-pixel, and a second white sub-pixel.

18. The display of claim 17, wherein a portion of the barrier layer, adjacent to the left eye pixel, overlaps a portion of the left eye pixel, and wherein a portion of the barrier layer, adjacent to the right eye pixel, overlaps a portion of the right eye pixel.

19. The display of claim 13, wherein the display device layer comprises:
   color filters on the driving circuit layer and at areas corresponding to the red sub-pixel, the green sub-pixel, the blue sub-pixel, and the white sub-pixel;
   a first electrode layer on the color filters, wherein the first electrode layer is configured to transmit light;
   an organic emission layer on the first electrode layer and configured to emit white light; and
   a second electrode layer on the organic emission layer and having reflexibility.

20. The display of claim 19, wherein a portion of the barrier layer overlaps a portion of the color filters.

21. The display of claim 13, wherein a distance between the barrier layer and the display device layer is in a range of 1 micrometer (μm) to 1.5 millimeters (mm).

22. The display of claim 1, further comprising an encapsulation layer on the display device layer,
   wherein the display device layer is between the encapsulation layer and the driving circuit layer.

23. The display of claim 13, further comprising an encapsulation layer on the display device layer,
   wherein the display device layer is between the encapsulation layer and the driving circuit layer.

* * * * *